US010169699B1

United States Patent
Chitiveli et al.

(10) Patent No.: US 10,169,699 B1
(45) Date of Patent: *Jan. 1, 2019

(54) COGNITIVE INTERACTIVE ELEVATOR ASSISTANT

(71) Applicant: INTERNATIONAL BUSINESS MACHINES CORPORATION, Armonk, NY (US)

(72) Inventors: Srinivas V. Chitiveli, Germantown, MD (US); Eric B. Libow, Raleigh, NC (US); Prasanna A. Mathada, Karnataka (IN); Sathiskumar Palaniappan, Namakkal (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,196

(22) Filed: Nov. 14, 2017

Related U.S. Application Data

(63) Continuation of application No. 15/658,432, filed on Jul. 25, 2017.

(51) Int. Cl.
  *G06N 3/00* (2006.01)
  *G06N 5/04* (2006.01)
  (Continued)

(52) U.S. Cl.
  CPC ............. *G06N 3/006* (2013.01); *G06F 3/167* (2013.01); *G06N 5/04* (2013.01); *G06F 3/0482* (2013.01)

(58) Field of Classification Search
  None
  See application file for complete search history.

(56) References Cited

U.S. PATENT DOCUMENTS

| 4,590,604 A | 5/1986 | Feilchenfeld |
| 6,382,363 B1 | 5/2002 | Friedli |

(Continued)

OTHER PUBLICATIONS

Disclosed Anonymously, "Method to add voice activation tags to content which will be presented in a web conference," An IP.com Prior Art Database Technical Disclosure, IP.com No. IPCOM000215519DIP.com, Electronic Publication Date: Mar. 6, 2012, pp. 1-3.

Disclosed Anonymously, "General Purpose Add-On Voice Activation," An IP.com Prior Art Database Technical Disclosure, IP.com No. IPCOM000237763DIP.com, Electronic Publication Date: Jul. 9, 201, pp. 1-2.

(Continued)

*Primary Examiner* — Alan Chen
(74) *Attorney, Agent, or Firm* — Erik K. Johnson; Reza Sarbakhsh

(57) ABSTRACT

A method for providing an interactive elevator assistant is provided. The method may include identifying amenities associated with a property and location-based features within a vicinity of the property. The method may further include mapping the amenities to floor levels associated with the property. The method may further include receiving user input from a user located on an elevator associated with the property. The method may further include, in response to determining that the received user input comprises an amenity, determine the one or more floor levels on the property that are associated with the amenity and triggering the elevator to navigate to the determined one or more floor levels. The method may also include, in response to determining that the received user input comprises a location-based feature, sending the received user input to an application for processing. The method may further include providing a response via the elevator.

1 Claim, 6 Drawing Sheets

(51) Int. Cl.
*G06F 3/16* (2006.01)
*G06F 3/0482* (2013.01)

(56) References Cited

U.S. PATENT DOCUMENTS

| | | | |
|---|---|---|---|
| 8,678,142 B2 | 3/2014 | Takeuchi | |
| 9,477,317 B1 | 10/2016 | Clements | |
| 2002/0020586 A1* | 2/2002 | Bauer | B66B 1/468 |
| | | | 187/391 |
| 2006/0151256 A1 | 7/2006 | Lee | |
| 2010/0253643 A1 | 10/2010 | McKay | |
| 2013/0205214 A1* | 8/2013 | Gazdzinski | G06Q 30/0251 |
| | | | 715/728 |
| 2016/0031675 A1 | 2/2016 | Silvennoinen et al. | |
| 2016/0214830 A1 | 2/2016 | Simcik et al. | |
| 2017/0122744 A1* | 5/2017 | Long | G01C 21/005 |
| 2017/0260024 A1* | 9/2017 | Sha | B66B 3/00 |

OTHER PUBLICATIONS

Ahmetovic et al., "NavCog: A Navigational Cognitive Assistant for the Blind," MobileHCI '16, Sep. 6-9, 2016, Florence, Italy, Copyright 2016 held by the owner/author(s), Publication rights licensed to ACM, ISBN 978-1-4503-44-8, Jan. 16, 2009, pp. 1-9.

Schrom-Feiertag et al., "Using Cognitive Agent-based Simulation for the Evaluation of Indoor Wayfinding Systems," A Case Study, DDSS 2016 (Best date available), pp. 1-15.

Mell et al., "The NIST Definition of Cloud Computing," National Institute of Standards and Technology, U.S. Department of Commerce, Special Publication 800-145, Sep. 2011, pp. 1-7.

Chitiveli et al., Pending U.S. Appl. No. 15/658,432, filed Jul. 25, 2017, titled "Cognitive Interactive Elevator Assistant," pp. 1-36.

IBM: List of IBM Patents or Patent Applications Treated as Related (Appendix P), Nov. 14, 2017, pp. 1-2.

* cited by examiner

COGNITIVE INTERACTIVE ELEVATOR ASSISTANT

BACKGROUND

The present invention relates generally to the field of computing, and more specifically, to internet of things (IoT) associated with elevators.

Generally, elevators may be used to access different levels associated with a property such as hotels, residences, and office buildings. Typically, when taking an elevator, users/guests may manually press a button associated with a floor number to access a corresponding floor level. Additionally, voice-based elevator operations may also be used, whereby the elevator may be equipped with a microphone within the elevator to receive a user's voice saying the floor number.

SUMMARY

A method for providing an elevator assistant is provided. The method may include identifying a plurality of amenities associated with a property, and identifying a plurality of location-based features within a vicinity of the property. The method may further include mapping the plurality of identified amenities to one or more floor levels associated with the property. The method may also include storing the plurality of identified and mapped amenities. The method may further include receiving user input from a user located on an elevator associated with the property. The method may further include, in response to determining that the received user input comprises at least one amenity associated with the stored plurality of identified and mapped amenities, determining the one or more floor levels on the property that are associated with the at least one amenity and triggering the elevator to navigate to the determined one or more floor levels. The method may also include, in response to determining that the received user input comprises at least one location-based feature associated with the plurality of location-based features within the vicinity of the property, sending the received user input to an application for processing. The method may further include, providing a response to the user on the elevator based on the determined one or more floor levels and the processed received user input via the application.

A computer system for providing an elevator assistant is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying a plurality of amenities associated with a property, and identifying a plurality of location-based features within a vicinity of the property. The method may further include mapping the plurality of identified amenities to one or more floor levels associated with the property. The method may also include storing the plurality of identified and mapped amenities. The method may further include receiving user input from a user located on an elevator associated with the property. The method may further include, in response to determining that the received user input comprises at least one amenity associated with the stored plurality of identified and mapped amenities, determining the one or more floor levels on the property that are associated with the at least one amenity and triggering the elevator to navigate to the determined one or more floor levels. The method may also include, in response to determining that the received user input comprises at least one location-based feature associated with the plurality of location-based features within the vicinity of the property, sending the received user input to an application for processing. The method may further include, providing a response to the user on the elevator based on the determined one or more floor levels and the processed received user input via the application.

A computer program product for providing an interactive elevator assistant is provided. The computer program product may include one or more computer-readable storage devices and program instructions stored on at least one of the one or more tangible storage devices, the program instructions executable by a processor. The computer program product may include program instructions to identify a plurality of amenities associated with a property, and identify a plurality of location-based features within a vicinity of the property. The method may further include mapping the plurality of identified amenities to one or more floor levels associated with the property. The computer program product may further include program instructions to store the plurality of identified and mapped amenities. The computer program product may also include program instructions to receive user input from a user located on an elevator associated with the property. The computer program product may also include program instructions to, in response to determining that the received user input comprises at least one amenity associated with the stored plurality of identified and mapped amenities, determine the one or more floor levels on the property that are associated with the at least one amenity and triggering the elevator to navigate to the determined one or more floor levels. The computer program product may further include program instructions to, in response to determining that the received user input comprises at least one location-based feature associated with the plurality of location-based features within the vicinity of the property, send the received user input to an application for processing. The computer program product may also include program instructions to provide a response to the user on the elevator based on the determined one or more floor levels and the processed received user input via the application.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
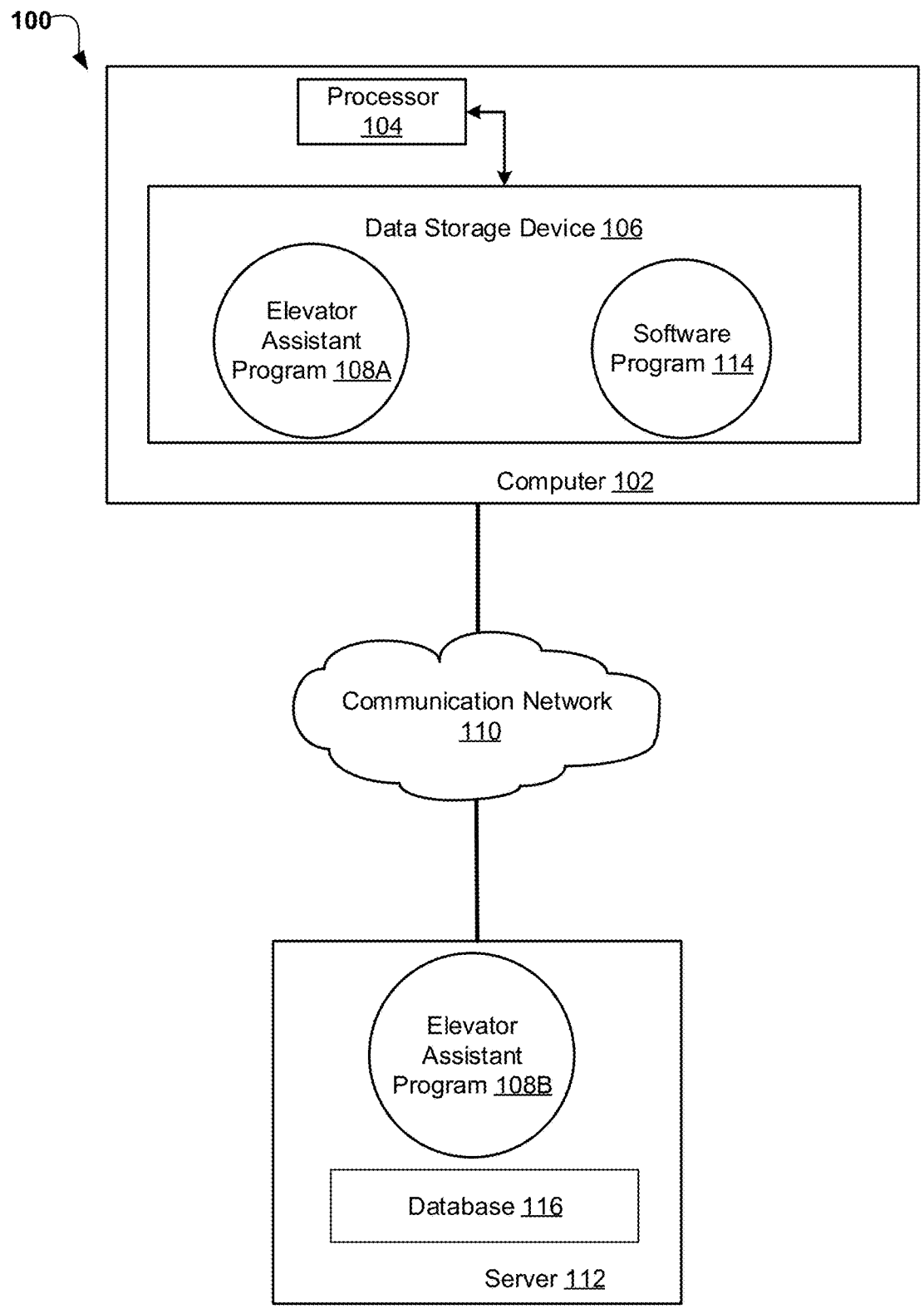
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to internet of things (IoT) associated with elevators. The following described exemplary embodiments provide a system, method and program product for providing an interactive elevator assistant. Specifically, the present embodiment has the capacity to improve the technical field associated with elevators by enabling elevators to navigate to different floor levels associated with a property, as well as provide responses to users based on amenities associated with a property, in response to received descriptions of the amenities associated with the property. Specifically, the system, method and program product may identify amenities of a property, map the different amenities of the property to corresponding floor levels associated with the property, and provide a response to users as well as navigate to the corresponding floor levels in response to receiving a description of the different amenities from a user.

As previously described with respect to IoT, when taking an elevator, users/guests may manually press a button associated with a floor number or may audibly say the floor number to access the corresponding floor level of a given property. For example, a user using an elevator may audibly say "$4^{th}$ floor" to access floor level 4. In such cases, navigation of the elevator is exclusively dependent on the user providing the floor number. Specifically, users would have to know and provide the floor number of the floor level they would like to access before navigating to that floor level. However, in certain cases, users/guests may not know the floor number and/or floor level they would like to access, but instead may know the feature the user would like to access or inquire about. For example, users using an elevator in a hotel may want to access a floor level that includes a certain amenity such as an ice machine. However, the users may not know the floor numbers that are associated with the ice machines, and in turn, the users may have to go through a process of discovering the floor numbers for the ice machines before navigating to the floor levels that include the ice machines. Such a process can be inconvenient and time-consuming for users. As such, it may be advantageous, among other things, to provide a system, method and program product for providing an interactive elevator assistant capable of receiving a description of amenities associated with a property to enable an elevator to navigate to the floor level comprising the described amenities as well as provide responses to users based on the amenities associated with the property. Specifically, the system, method, and program product may identify amenities of a property, map the different amenities of the property to corresponding floor levels associated with the property, navigate to the corresponding floor levels, as well as provide responses to users in response to receiving a description of the different amenities from a user. Additionally, the system, method, and program product may identify location-based features of a property, such as weather and surrounding areas, that may be sent to and processed by an application, and responses may be provided to users on an elevator based on a description of the location-based features.

According to at least one implementation of the present embodiment, amenities and locations-based feature associated with a property may be identified. Next, the identified amenities may be mapped to floor levels associated with the property. Then, the identified and mapped amenities may be stored. Next, user input may be received from a user located on an elevator of the property. Next, a floor level associated with at least one amenity associated with the identified amenities may be determined and the elevator may be triggered to navigate to the determined floor level in response to determining that the received user input comprises at least one amenity. Then, the received user input may be sent to an application for processing in response to determining that the received user input comprises at least one location-based feature associated with the identified location-based features. Next, an audible response may be provided to the user on the elevator.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for providing an cognitive interactive elevator assistant.

According to at least one implementation, amenities and locations-based feature associated with a property may be identified. Next, the identified amenities may be mapped to floor levels associated with the property. Then, the identified and mapped amenities may be stored. Next, user input may be received from a user located on an elevator of the property. Next, a floor level associated with at least one amenity associated with the identified amenities may be determined and the elevator may be triggered to navigate to the determined floor level in response to determining that the received user input comprises at least one amenity. Then, the received user input may be sent to an application for processing in response to determining that the received user input comprises at least one location-based feature associated with the identified location-based features. Next, an audible response may be provided to the user on the elevator.

Referring now to FIG. 1, an exemplary networked computer environment 100 in accordance with one embodiment is depicted. The networked computer environment 100 may include a computer 102 with a processor 104 and a data storage device 106 that is enabled to run an elevator assistant program 108A and a software program 114, and may also include a microphone (not shown). The networked computer environment 100 may be associated with an elevator, whereby the networked computer environment 100 may be located on and/or in communication with the elevator via a communication network, such as communication network 110. The software program 114 may be an application program such as a weather application program and internet search application program. The elevator assistant program 108A may communicate with the software program 114. The networked computer environment 100 may also include a server 112 that is enabled to run an elevator assistant program 108B and the communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the elevator assistant program 108A, 108B may interact with a database 116 that may be embedded in various storage devices, such as, but not limited to, a mobile device 102, a networked server 112, or a cloud storage service.

According to the present embodiment, a program, such as an elevator assistant program 108A and 108B may run on the client computer 102 or on the server computer 112 via a communications network 110. The elevator assistant program 108A, 108B may enable an elevator to navigate to a floor level of a property in response to receiving a description of a feature associated with the property from a user. Specifically, a computer associated with an elevator, such as computer 102, may run an elevator assistant program 108A, 108B, that may interact with a database 116 and a software program 114, to map and store different amenities of a property to corresponding floor levels associated with the property, and may navigate to the corresponding floor levels in response to receiving a description of the different amenities and amenities from a user. Furthermore, the elevator assistant program 108A, 108B may identify location-based features of a property that are related to an application, and provide responses to users on an elevator in response to a description of the location-based features.

Figure 2:
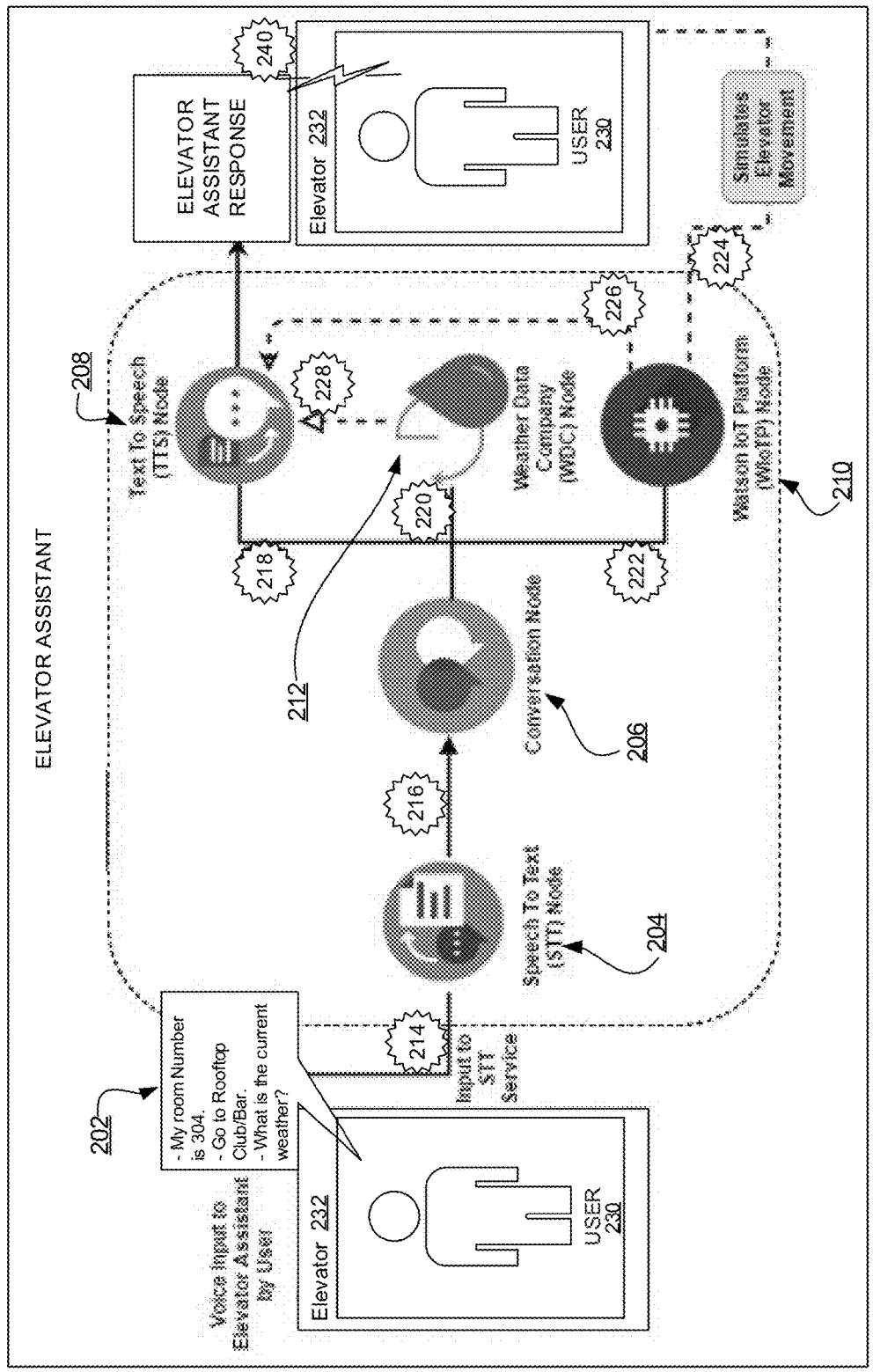
FIG. 2 is a flow diagram illustrating a flow of execution for an interactive elevator assistant program according to one embodiment.

Referring now to FIG. 2, a flow diagram 200 illustrating a flow of execution for an elevator assistant program 108A, 108B is depicted. Specifically, according to one embodiment, the elevator assistant program 108A, 108B (FIG. 1) may be stored on one or more processors, one or more computer-readable memories, and/or one or more computer-readable tangible storage devices associated with an elevator, and may include a speech-to-text node 204, a conversation assistant node 206, a text-to-speech node 208, a platform for device management and analytics node such as an IBM Watson® IoT Platform node 210 (IBM Watson and all IBM Watson-based trademarks and logos are trademarks or registered trademarks of International Business Machines Corporation and/or its affiliates), and an application node 212 that may include software program 114 (FIG. 1) comprising an application such as a weather service data company.

The elevator assistant program 108A, 108B (FIG. 1) may receive user input 202 from a user 230 located on an elevator 232. Thereafter, at 214, the elevator assistant program 108A, 108B (FIG. 1) may feed the received user input into the speech-to-text node 204, whereby the elevator assistant program 108A, 108B (FIG. 1) may convert the received user input into to text. Next, at 216, the elevator assistant program 108A, 108B (FIG. 1) may send the converted user input to the conversation node 206, whereby the conversation node 206 may include stored responses to the converted user input. Next, at 218, the elevator assistant program 108A, 108B (FIG. 1) may send one or more of the stored responses to the text-to-speech node 208, which may convert the stored responses from text to speech. Alternatively, at 220, the elevator assistant program 108A, 108B (FIG. 1) may send the stored responses to the application node 212, such as a weather service data company application, in response to the determination that the stored response to the converted user input requires further processing from an application. Furthermore, at 222, the elevator assistant program 108A, 108B (FIG. 1) may send the stored responses to the platform for device management and analytics node 210, such as IBM Watson® IoT Platform. Then, at 224, using the IBM Watson® IoT Platform node 210, the elevator assistant program 108A, 108B (FIG. 1) may trigger movement of the elevator to a desired floor level of a property based on the stored responses to the received user input. Furthermore, at 226, the elevator assistant program 108A, 108B (FIG. 1) may send an audible acknowledgement response to confirm the desired floor level based on the received user input. Additionally, at 228, the elevator assistant program 108A, 108B (FIG. 1) may provide an audible application response based on the processed stored response. Then, at 240, using the text-to-speech node 208, the elevator assistant program 108A, 108B (FIG. 1) may provide an audible response to the user 230, whereby the audible response comprises the audible acknowledgement response and/or the audible application response.

Figure 3:
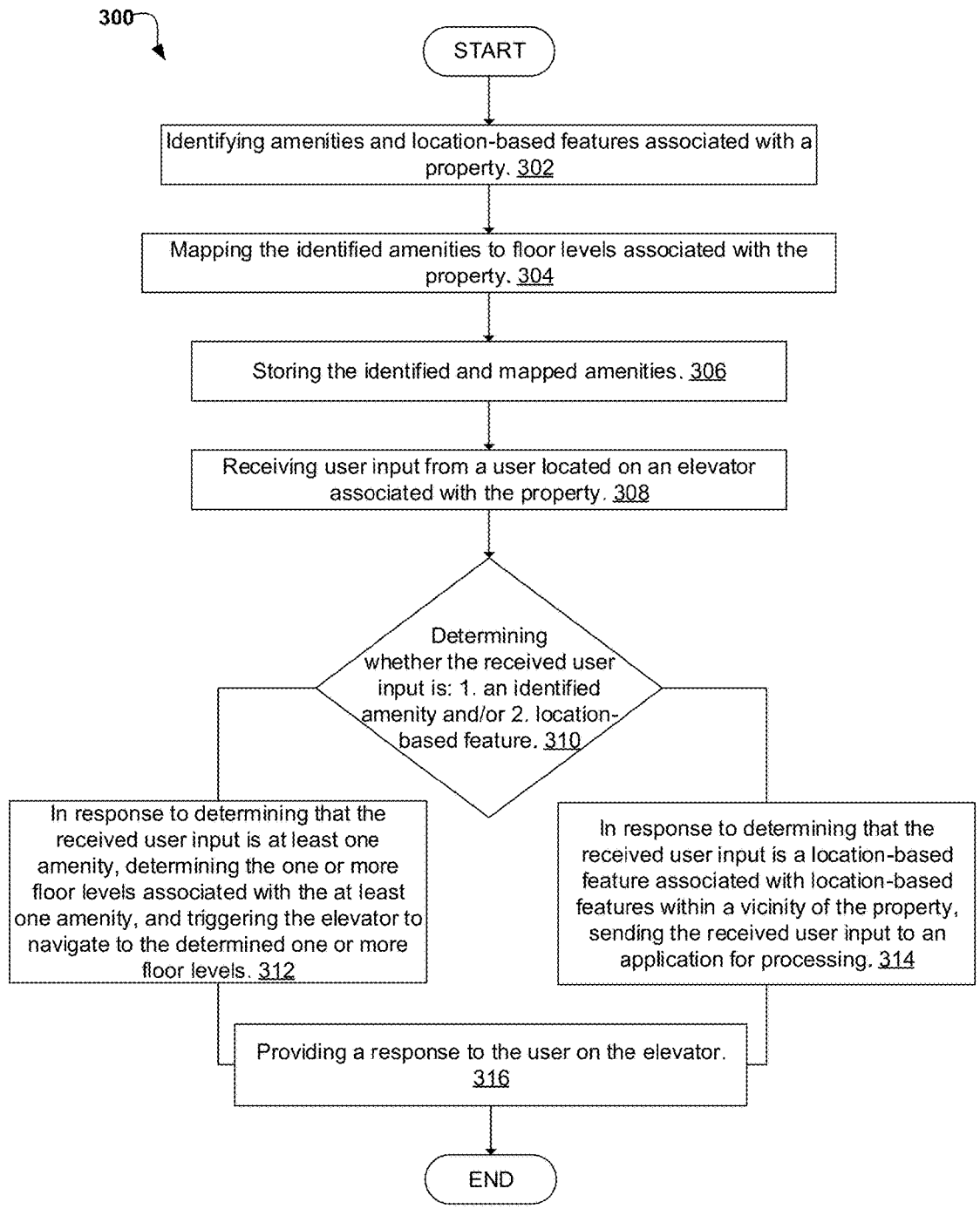
FIG. 3 is an operational flowchart illustrating the steps carried out by a program for providing an interactive elevator assistant according to one embodiment.

Referring now to FIG. 3, an operational flowchart 300 illustrating the steps carried out by a program for providing an interactive elevator assistant is depicted. At 302, the elevator assistant program 108A, 108B (FIG. 1) may identify amenities and location-based features associated with a property. For example, and as previously described in FIG. 1, the elevator assistant program 108A, 108B (FIG. 1) may query a database 116 (FIG. 1) and/or software program 114 (FIG. 1), such as a featured application, that may include schematics/diagrams of the property which may describe certain amenities, and/or may query the software program 114 (FIG. 1) that may include an application such as an internet search application and weather application that may describe certain location-based features such as the weather and surrounding areas of the property. Also, according to one embodiment, the elevator assistant program 108A, 108B (FIG. 1) may identify amenities associated with a property by directly receiving property information inputted by an administrator associated with the property. Specifically, for example, the elevator assistant program 108A, 108B (FIG. 1) may provide an interface to enable an administrator to input amenities associated with the property. Then, based on the query and/or provided property information associated with the property, the elevator assistant program 108A, 108B (FIG. 1) may identify the amenities of the property, whereby the amenities may include specific facilities, rooms, and room numbers associated with the property comprising for example, but not limited to, bathrooms, ice machines, lounges, restaurants/bars on the property, spas, gyms, hotel rooms, and offices. Furthermore, for example, based on the query associated with location-based features within a vicinity of the property, the elevator assistant program 108A, 108B (FIG. 1) may identify location-based features such as weather outside the property, and restaurants and stores in a vicinity of the property.

Next, at 304, the elevator assistant program 108A, 108B (FIG. 1) may map the identified amenities of the property to floor levels associated with the property. As previously described at step 302, the elevator assistant program 108A, 108B (FIG. 1) may identify amenities associated with a property by querying a database 116 (FIG. 1) and/or a software program 114 (FIG. 1). Thereafter, according to one embodiment, the elevator assistant program 108A, 108B (FIG. 1) may map or associate one or more of the identified amenities with floor levels of the property. For example, for a property such as a hotel, the elevator assistant program 108A, 108B (FIG. 1) may identify amenities like certain rooms and facilities located in the hotel that may include a hotel guest's specific room, ice machines, lounge area, computer room area, restaurant and bars, gym, and rooftop. As such, the elevator assistant program 108A, 108B (FIG. 1) may map each of the identified amenities to the floor level associated with the identified amenity. Specifically, for example, the elevator assistant program 108A, 108B (FIG. 1) may identify ice machines as an amenity associated with the property, and may map the identified ice machines to floor levels 2, 4, and 6 where the ice machines are located on the property.

Then, at 306, the elevator assistant program 108A, 108B (FIG. 1) may store the identified and mapped amenities. As previously described at steps 302 and 304, the elevator assistant program 108A, 108B (FIG. 1) may identify amenities associated with a property, and may map one or more of the identified amenities of the property to floor levels associated with the property. Thereafter, the elevator assistant program 108A, 108B (FIG. 1) may store the identified and mapped amenities. Specifically, for example, the elevator assistant program 108A, 108B (FIG. 1) may store the identified and mapped amenities on a database such as database 116 (FIG. 1) which may be an amenity floor level database.

Next, at 308, and as previously described in FIG. 2, the elevator assistant program 108A, 108B (FIG. 1) may receive user input 202 (FIG. 2) from a user 230 (FIG. 2) located on an elevator 232 (FIG. 2), wherein the user input may include a description, a statement, and/or a phrase associated with an amenity of the property and/or a location-based feature in a vicinity of the property. Specifically, according to one embodiment, the elevator assistant program 108A, 108B (FIG. 1) may receive user input such as receiving a user's voice to describe the amenity of interest and/or the location-based feature of interest associated with the property. For example, and as described in FIG. 2, the elevator assistant program 108A, 108B (FIG. 1) may receive user input such as receiving a user saying "my room number is 304," and/or "go to the rooftop club/bar," and/or "what is the current weather."

Then, at 310, the elevator assistant program 108A, 108B (FIG. 1) may determine whether the received user input comprises at least one amenity associated with the identified and mapped amenities, and/or comprises at least one location-based feature associated with the location-based features within a vicinity of the property. Specifically, for example, the elevator assistant program 108A, 108B (FIG. 1) may analyze the received user input by using the conversation node 206 (FIG. 2) to extract and analyze keywords associated with the received user input, and may compare the keywords to keywords associated with the stored identified and mapped amenities and/or compare the keywords to one or more trigger words associated an application feature. Furthermore, and as previously described in FIG. 2 at 216, the conversation node 206 (FIG. 2) may analyze the received user input and may include stored responses to the received user input. According to one embodiment, the stored responses may include identifying the amenity and the floor level of the amenity associated with the property, and/or identifying the location-based feature and the application associated with the location-based feature. For example, in response to receiving the user statement "go to the rooftop club/bar" from a user on an elevator of a hotel property, and based on extraction and analysis, the elevator assistant program 108A, 108B (FIG. 1) may identify the received user input as property amenity, whereby the property amenity is a club/bar that is located on the rooftop of the hotel. Also, for example, in response to receiving the user statement "what is the current weather" from the user on the elevator of the hotel property, the elevator assistant program 108A, 108B (FIG. 1) may identify the received user input as a location-based feature, and may send a weather inquiry intended for processing by a weather application, such as weather data company node 212 (FIG. 2). Furthermore, for example, in response to receiving the user statement "what are the nearest rooftop clubs/bars" from a user on an elevator of a hotel property, the elevator assistant program 108A, 108B (FIG. 1) may identify the received user input as both a property amenity inquiry and a location-based feature inquiry, whereby the elevator assistant program 108A, 108B (FIG. 1) may identify the hotel rooftop club/bar as a nearby rooftop club/bar as well as send the received user input to an application to determine other nearby rooftop clubs/bars based on a vicinity of the hotel (i.e. within 10 miles of the hotel).

Next, at 312, in response to determining that the received user input is at least one amenity associated with the identified and mapped amenities of the property, the elevator assistant program 108A, 108B (FIG. 1) may determine a floor level associated with the at least one identified amenity and trigger the elevator to navigate to the determined floor level. Specifically, and as previously described at step 310, the elevator assistant program 108A, 108B (FIG. 1) may include stored responses as well as an amenity floor level database that may identify the amenity and floor level of the amenity associated with a property. Furthermore, and as previously described in FIG. 2 at 222, the elevator assistant program 108A, 108B (FIG. 1) may query the amenity floor level database to map the identified amenity to the floor level associated with the identified amenity, and send the mapped identified amenity to the platform for device management and analytics node 210 (FIG. 2), such as the IBM Watson® IoT Platform to trigger movement of the elevator to the desired floor level based on the query. For example, and as previously described, in response to receiving the user statement "go to the rooftop club/bar" from a user on an elevator of a hotel property, the elevator assistant program 108A, 108B (FIG. 1) may identify the property amenity as a club/bar that is located on the rooftop, and in turn, may determine that the floor level is the rooftop of the hotel by querying the amenity floor level database to map the identified club/bar to the rooftop floor level. Therefore, the elevator assistant program 108A, 108B (FIG. 1) may trigger the elevator to navigate to the rooftop of the hotel property.

Alternatively, at 314, in response to determining that the received user input is at least one location-based feature associated with the location-based features of the property, the elevator assistant program 108A, 108B (FIG. 1) may send the received user input to an application comprising the at least one location-based feature for processing. Specifically, and as previously described at step 310, the elevator assistant program 108A, 108B (FIG. 1) may extract and analyze keywords associated with the received user input, and may compare the keywords to one or more trigger words, such as "current" and "weather," associated with an application feature. For example, in response to receiving the user statement "what is the current weather" from the user on the elevator of the hotel property, based on the extracted keyword analysis identifying "current" and "weather," the elevator assistant program 108A, 108B (FIG. 1) may identify the location-based feature as a weather inquiry intended for processing by a weather application. Therefore, the elevator assistant program 108A, 108B (FIG. 1) may send the received user input to a weather application associated with weather data company node 212 (FIG. 2), whereby the weather data company node 212 (FIG. 2) may use the global positioning system (GPS) location of the property to determine the current weather outside of the property.

Then, at 316, based on the determined amenities, the elevator assistant program 108A, 108B (FIG. 1) may provide a response to the user on the elevator. Specifically, and as previously described in FIG. 2 at 226 and 240, the elevator assistant program 108A, 108B (FIG. 1) may send an acknowledgement response to confirm the desired floor level based on the received user input and the at least one identified amenity. Additionally, and as previously described in FIG. 2 at 228 and 240, the elevator assistant program 108A, 108B (FIG. 1) may provide an application response to the identified and processed location-based feature that is processed by an application. For example, in response to receiving the user statement "go to the rooftop club/bar" from a user on an elevator of a hotel property, the elevator assistant program 108A, 108B (FIG. 1) may provide an audible response such as "rooftop floor level confirmed" as an acknowledgement that the elevator is navigating to the rooftop. Also, for example, in response to receiving the user statement "what is the current weather" from the user on the elevator of the hotel property, the elevator assistant program 108A, 108B (FIG. 1) may provide the audible response "the current weather is 76 degrees."

It may be appreciated that FIG. 2 provides only illustrations of one implementation and does not imply any limitations with regard to how different embodiments may be implemented. Many modifications to the depicted environments may be made based on design and implementation requirements.

Figure 4:
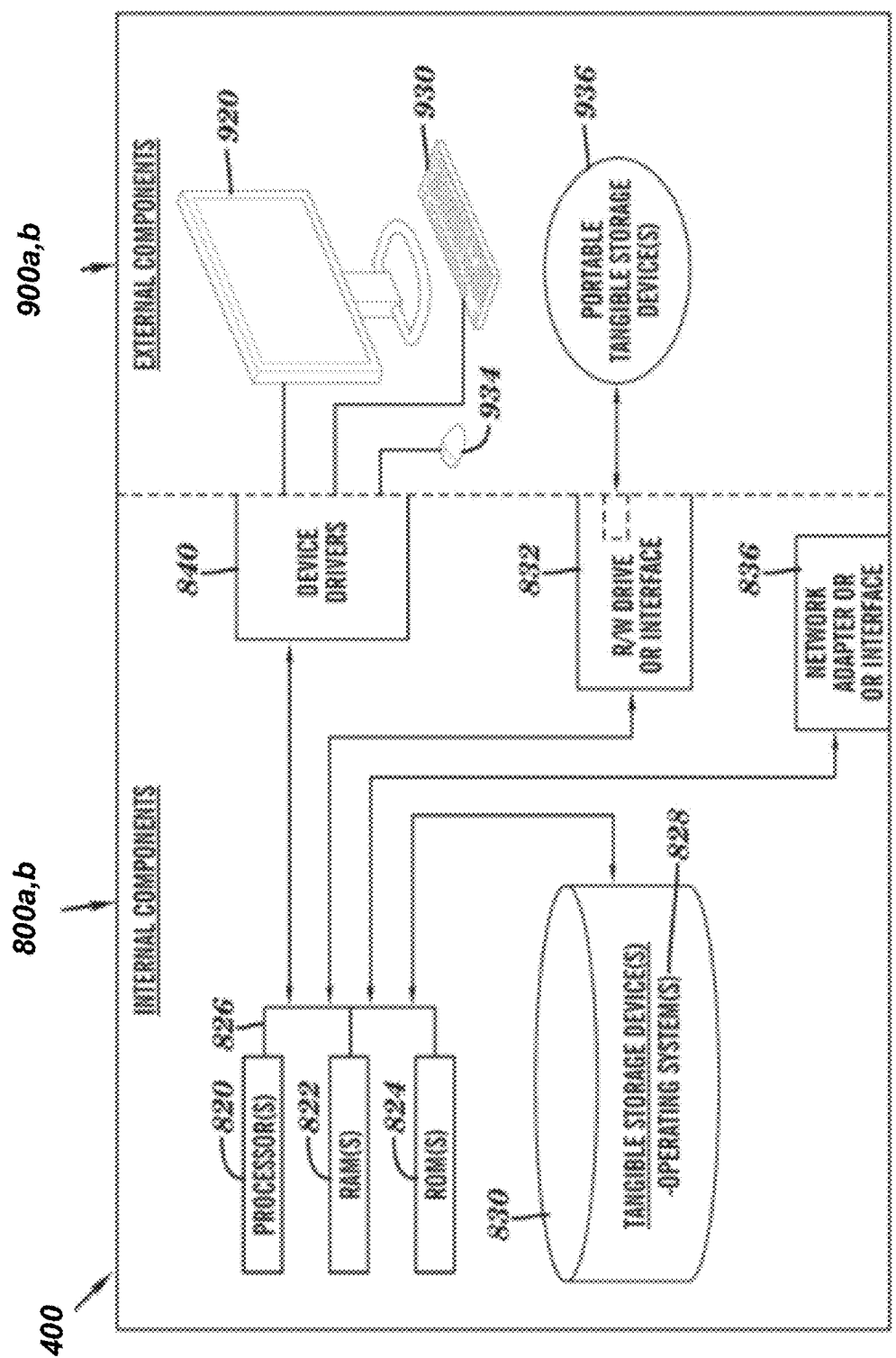
FIG. 4 is a block diagram of the system architecture of a program for providing an interactive elevator assistant in accordance with an embodiment of the present disclosure.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements. For example, the computer 102 (FIG. 2) associated with an elevator may include an interactive touchscreen (i.e. located on the elevator), and at step 306, the elevator assistant program 108A, 108B (FIG. 1) may provide a user interface to the user via the interactive touchscreen to receive the user input via a user typing on the user interface. More specifically, for example, the elevator assistant program 108A, 108B (FIG. 1) may receive user input by receiving a user typing via the interactive touchscreen and the user interface, "304" to indicate a room number, and/or "Rooftop," and/or "Weather." Additionally, according to one embodiment, the elevator assistant program 108A, 108B (FIG. 1) may provide a list of the amenities associated with a property via the interactive touchscreen and the user interface, whereby the user may select from the list an amenity of interest.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800a, b and external components 900a, b illustrated in FIG. 4. Each of the sets of internal components 800a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the elevator assistant program 108A (FIG. 1) in client computer 102 (FIG. 1), and the elevator assistant program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as an elevator assistant program 108A and 108B (FIG. 1), can be stored on one or more of the respective portable computer-readable tangible storage devices 936, read via the respective R/W drive or interface 832, and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The elevator assistant program 108A (FIG. 1) and software program 114 (FIG. 1) in client computer 102 (FIG. 1), and the elevator assistant program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the elevator assistant program 108A (FIG. 1) and software program 114 (FIG. 1) in client computer 102 (FIG. 1) and the elevator assistant program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
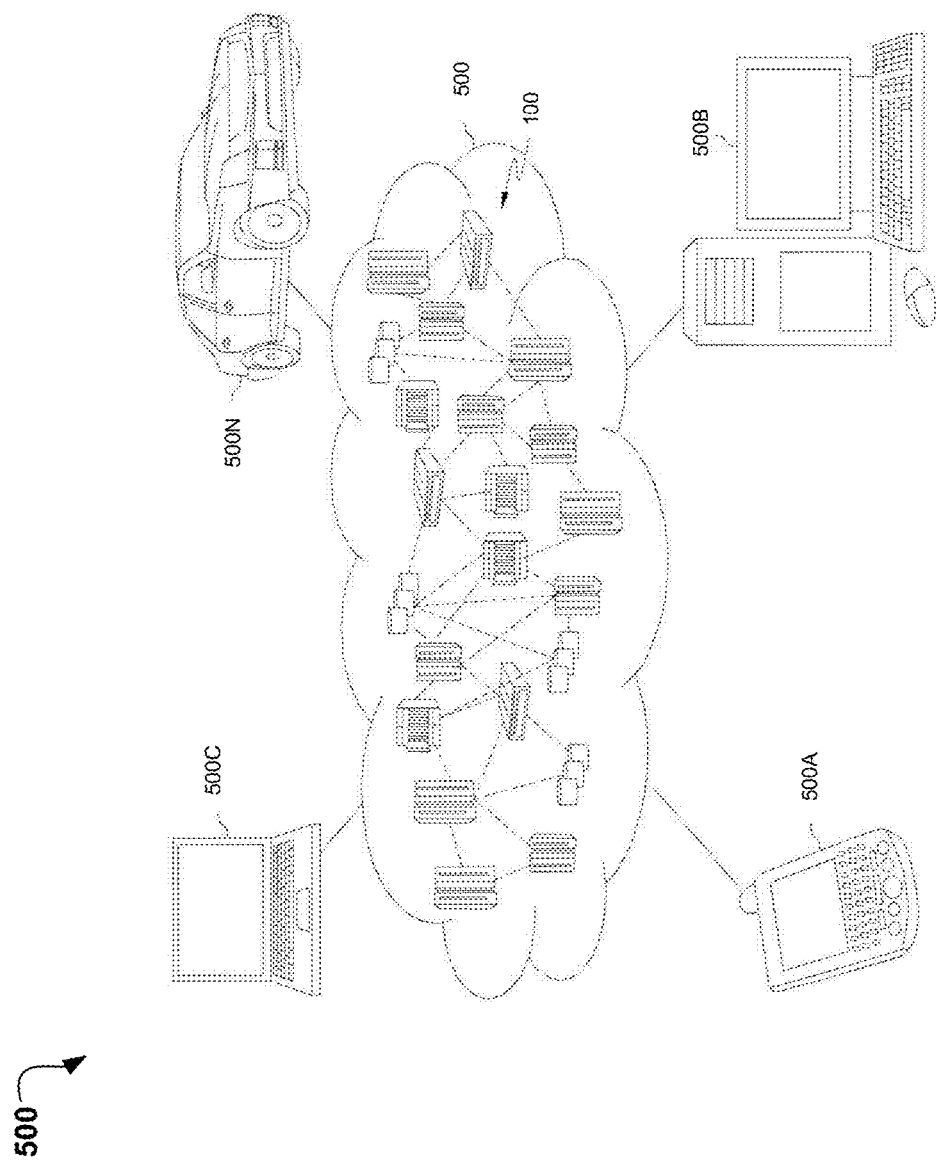
FIG. 5 is a block diagram of an illustrative cloud computing environment including the computer system depicted in FIG. 1 for providing an interactive elevator assistant in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
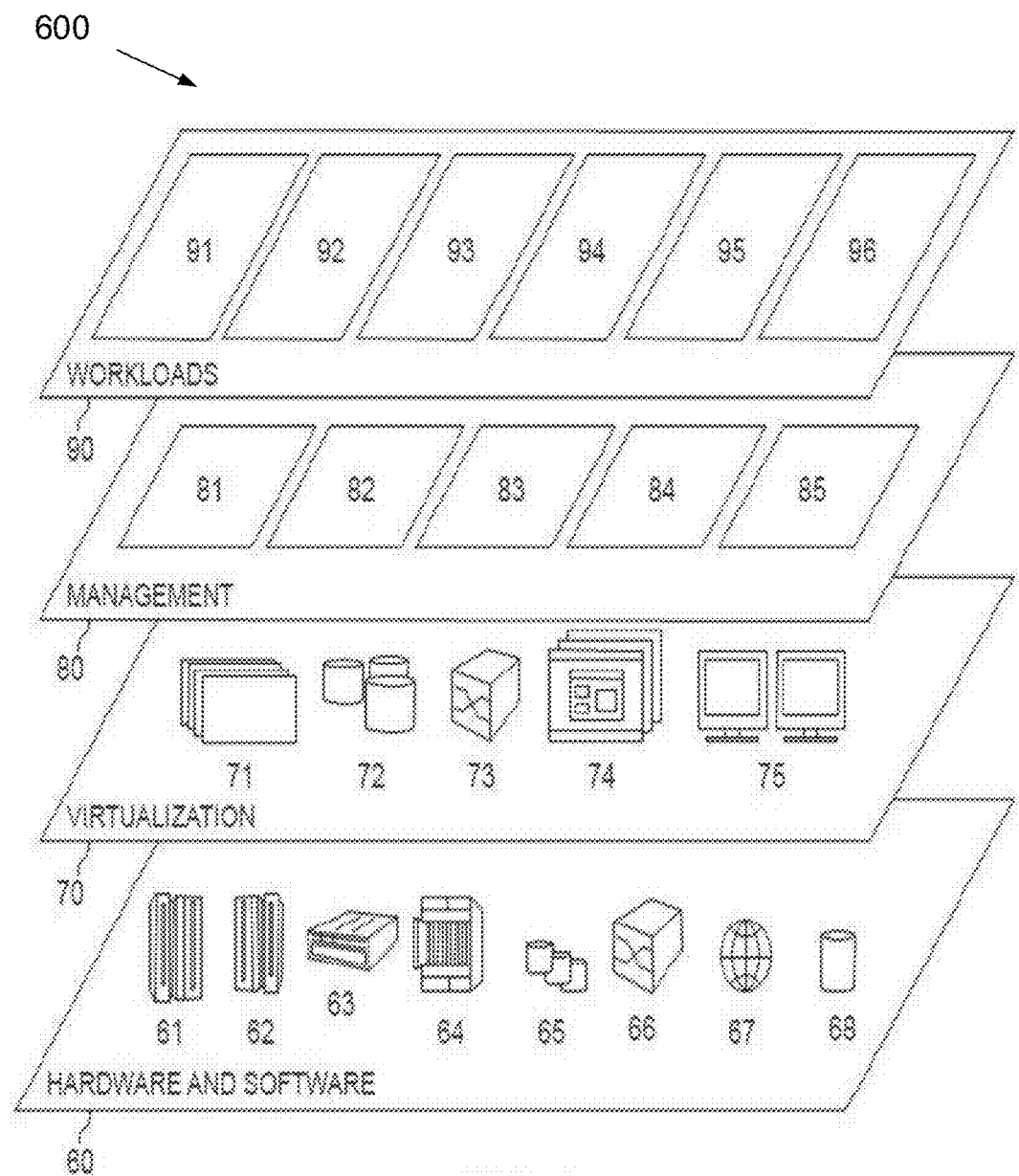
FIG. 6 is a block diagram of functional layers of the illustrative cloud computing environment of FIG. 5 for providing an interactive elevator assistant in accordance with an embodiment of the present disclosure

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and elevator assistant 96. An elevator assistant program 108A, 108B (FIG. 1) may be offered "as a service in the cloud" (i.e., Software as a Service (SaaS)) for applications running on mobile devices 102 (FIG. 1) and may provide a cognitive interactive elevator assistant.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for providing an interactive elevator assistant, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
identifying a plurality of amenities associated with a property, and identifying a plurality of location-based features within a vicinity outside of the property, wherein identifying a plurality of amenities comprises querying a database to identify the plurality of amenities, querying a first application to identify the plurality of amenities, and receiving a plurality of property information from an administrator via a user interface;
wherein the identified plurality of amenities are located on the property;
wherein the identified plurality of location-based features are located within a vicinity outside of the property;
mapping the plurality of identified amenities to one or more floor levels associated with the property;
storing the plurality of identified and mapped amenities;
receiving user input from a user located on an elevator associated with the property;
in response to determining that the received user input comprises at least one amenity associated with the stored plurality of identified and mapped amenities, determining the one or more floor levels on the property that are associated with the at least one amenity and triggering the elevator to navigate to the determined one or more floor levels;
in response to determining that the received user input comprises at least one location-based feature associated with the plurality of location-based features within the vicinity outside of the property, sending the received user input to a second application for processing; and
providing a response to the user on the elevator based on the determined one or more floor levels and the processed received user input via the first application and the second application, wherein the response comprises at least one of an audible acknowledgement of the determined one or more floor levels that the elevator is triggered to navigate to, and an audible application response based on the received application response.

* * * * *